United States Patent [19]

Matthias et al.

[11] Patent Number: 5,617,928
[45] Date of Patent: Apr. 8, 1997

[54] ELEMENTS FACED WITH SUPERHARD MATERIAL

[75] Inventors: Terry R. Matthias, Longlevens; John M. Fuller, Nailsworth; Nigel D. Griffin, Whitminster, all of England

[73] Assignee: Camco Drilling Group Limited, Stonehouse, England

[21] Appl. No.: 491,063

[22] Filed: Jun. 16, 1995

[30] Foreign Application Priority Data

Jun. 18, 1994 [GB] United Kingdom ............ 9412247

[51] Int. Cl.⁶ ........................................... E21B 10/46
[52] U.S. Cl. ............................................... 175/432
[58] Field of Search ................................ 175/425, 428, 175/432

[56] References Cited

U.S. PATENT DOCUMENTS

| | | |
|---|---|---|
| 4,784,023 | 11/1988 | Dennis . |
| 5,007,207 | 4/1991 | Phaal .................................. 175/432 X |
| 5,120,327 | 6/1992 | Dennis . |
| 5,351,772 | 10/1994 | Smith .................................. 175/432 X |
| 5,355,969 | 10/1994 | Hardy et al. ........................ 175/432 |
| 5,379,854 | 1/1995 | Dennis . |
| 5,421,425 | 6/1995 | Griffin .................................. 175/432 |
| 5,435,403 | 7/1995 | Tibbitts ................................ 175/432 |
| 5,460,233 | 10/1995 | Meany et al. ...................... 175/432 X |
| 5,472,376 | 12/1995 | Olmstead et al. ................. 175/432 X |
| 5,484,330 | 1/1996 | Flood et al. ........................ 175/432 X |
| 5,486,137 | 1/1996 | Flood et al. ........................ 175/432 X |
| 5,492,188 | 2/1996 | Smith et al. ........................ 175/432 |

FOREIGN PATENT DOCUMENTS

| | | |
|---|---|---|
| 2283772 | 5/1994 | United Kingdom . |
| 2283773 | 5/1995 | United Kingdom . |

Primary Examiner—William P. Neuder

[57] ABSTRACT

A preform cutting element, for use on a rotary drill bit, includes a facing table of polycrystalline diamond bonded to a tungsten carbide substrate, a cutting edge being formed by part of the peripheral surface of the facing table. The rear surface of the facing table is integrally formed with a plurality of spaced elongate ribs which project into the substrate, at least the majority of the ribs being located in the vicinity of the cutting edge. The ribs may intersect the cutting edge and extend only part way across the facing table from the cutting edge. The ribs may vary in width and/or depth.

14 Claims, 2 Drawing Sheets

ELEMENTS FACED WITH SUPERHARD MATERIAL

BACKGROUND OF THE INVENTION

The present invention relates to elements faced with superhard material, and particularly to preform cutting elements comprising a facing table of superhard material having a front face, a peripheral surface, and a rear surface bonded to a substrate of material which is less hard than the superhard material. Preform elements of this kind are often used as cutting elements on rotary drag-type drill bits, and the present invention will be particularly described in relation to such use. However, the invention is not restricted to cutting elements for this particular use, and may relate to preform cutting elements for other purposes. For example, elements faced with superhard material, of the kind referred to, may also be employed in work piece-shaping tools.

Preform elements used as cutting elements in rotary drill bits usually have a facing table of polycrystalline diamond, although other superhard materials are available, such as cubic boron nitride and amorphous diamond-like carbon (ADLC). The substrate of less hard material is often formed from cemented tungsten carbide, and the facing table and substrate are bonded together during formation of the element in a high pressure, high temperature forming press. This forming process is well known and will not be described in detail.

Each preform cutting element may be mounted on a carrier in the form of a generally cylindrical stud or post received in a socket in the body of the drill bit. The carrier is often formed from cemented tungsten carbide, the surface of the substrate being brazed to a surface on the carrier, for example by a process known as "LS bonding". Alternatively, the substrate itself may be of sufficient thickness as to provide, in effect, a cylindrical stud which is sufficiently long to be directly received in a socket in the bit body, without being brazed to a carrier. The bit body itself may be machined from metal, usually steel, or may be molded using a powder metallurgy process.

Such cutting elements are subjected to extremes of temperature during formation and mounting on the bit body, and are also subjected to high temperatures and heavy loads when the drill is in use down a borehole. It is found that as a result of such conditions spalling and delamination of the superhard facing table can occur, that is to say the separation and loss of the diamond or other superhard material over the cutting surface of the table. This may also occur in preform elements used for other purposes, and particularly where the elements are subjected to repetitive percussive loads, as in tappets and cam mechanisms.

Commonly, in preform elements of the above type the interface between the superhard table and the substrate has usually been flat and planar. However, particularly in cutting elements for drill bits, attempts have been made to improve the bond between the superhard facing table and the substrate by configuring the rear face of the facing table so as to provide a degree of mechanical interlocking between the facing table and substrate. One such arrangement is shown in U.S. Pat. No. 5,120,327 where the rear surface of the facing table is integrally formed with a plurality of identical spaced apart parallel ridges of constant depth. The facing table also includes a peripheral ring of greater thickness, the extremities of the parallel ridges intersecting the surrounding ring. U.S. Pat. No. 4,784,023 illustrates a similar arrangement but without the peripheral ring.

The present invention relates to further developments in preform elements which may overcome at least some of the problems which arise with existing designs as well as providing other advantages.

SUMMARY OF THE INVENTION

According to the invention there is provided a preform cutting element including a facing table of superhard material having a front face, a peripheral surface, and a rear surface bonded to a substrate which is less hard than the superhard material, a cutting edge forming part of the peripheral surface of the facing table, the rear surface of the facing table being formed with a plurality of spaced elongate fibs which project into the substrate, at least the majority of said ribs being located in the vicinity of said cutting edge. The ribs may be substantially parallel, and preferably at least one end of each rib intersects the peripheral surface of the facing table at a location on said cutting edge.

The ribs may be shaped, e.g. they may be arcuate, so that both ends of each rib intersect the peripheral surface of the facing table at a location on said cutting edge. Alternatively the ribs may be substantially straight and extend in directions transverse to said cutting edge. In this case the ribs may vary in length, being of maximum length in the region of the center of the cutting edge and being of progressively shorter length with distance away from the center of the cutting edge.

In another embodiment, the ribs comprise an array of concentric endless ribs located adjacent the cutting edge of the facing table, the outermost rib of the array preferably being substantially tangential to the cutting edge. The ribs may be substantially circular and of different depths.

In a further embodiment, the ribs include a first array of spaced substantially straight ribs, one end of each rib intersecting the cutting edge and the other end of each rib intersecting the periphery of the facing table opposite the cutting edge, and a second array of shorter substantially straight ribs spaced between the ribs of the first array and having both ends thereof spaced inwardly from the periphery of the facing table.

In any of the above arrangements one or more of said fibs may increase in depth and/or width as they extend towards the cutting edge.

DETAILED DESCRIPTION OF THE PREFERRED EMBODIMENTS

Figure 1:
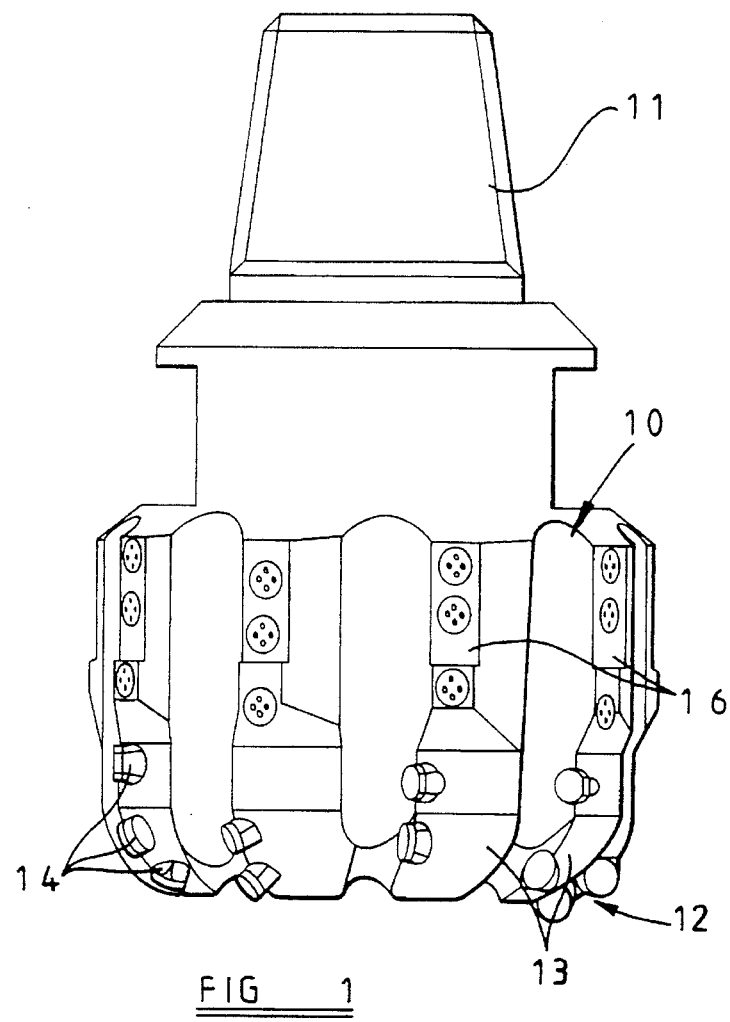
FIG. 1 is a side elevation of a typical drag-type drill bit in which cutting elements according to the present invention may be used.
Figure 2:
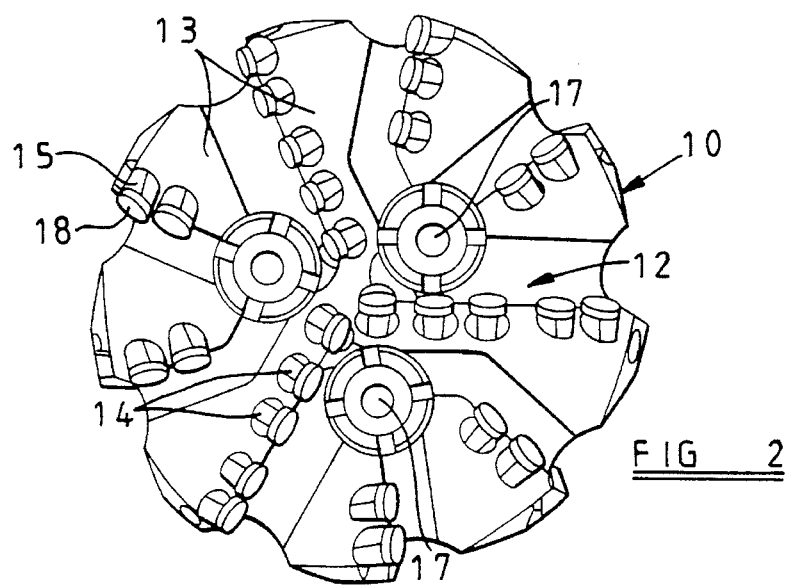
FIG. 2 is an end elevation of the drill bit shown in FIG. 1.

FIGS. 1 and 2 show a typical full bore drag-bit of a kind to which cutting elements of the present invention are applicable. The bit body 10 is machined from steel and has a shank formed with an eternally threaded tapered pin 11 at one end for connection to the drill string. The operative end face 12 of the bit body is formed with a number of blades 13 radiating from the central area of the bit, and the blades carry cutter assemblies 14 spaced apart along the length thereof. The bit has a gauge section including kickers 16 which contact the walls of the borehole to stabilize the bit in the borehole. A central passage (not shown) in the bit and shank delivers drilling fluid through nozzles 17 in the end face 12 in known manner.

Each cutter assembly 14 comprises a preform cutting element 18 mounted on a carrier 19 in the form of a post which is located in a socket in the bit body. Each preform cutting element is in the form of a circular tablet comprising a facing table of superhard material, usually polycrystalline diamond, bonded to a substrate which is normally of cemented tungsten carbide. The rear surface of the substrate is bonded, for example by LS bonding, to a suitably orientated surface on the post 19.

Figure 3:
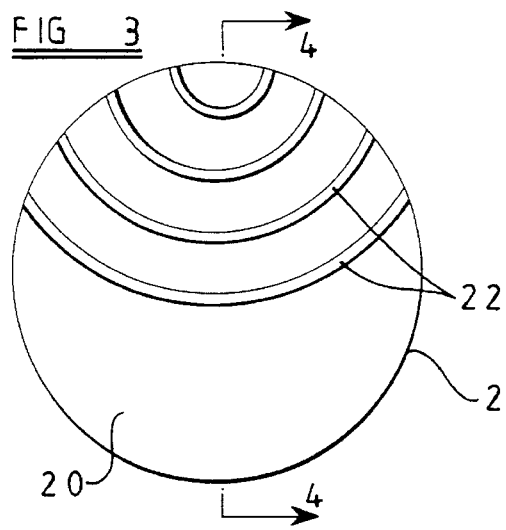
FIG. 3 is an underplan view, on an enlarged scale, of the superhard facing table of a preform cutting element in accordance with the invention, the substrate, which would normally be bonded to the underside of the facing table, being removed to show the configuration of the undersurface of the facing table.
Figure 4:
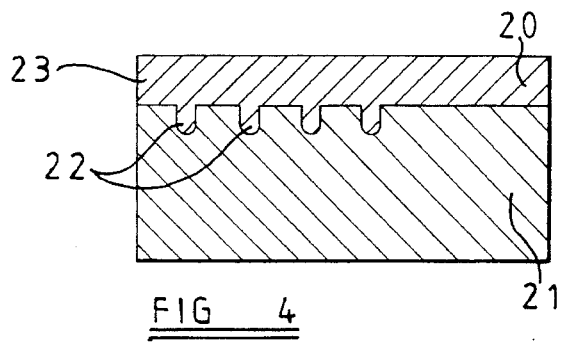
FIG. 4 is a cross-section of a cutting element incorporating the facing table of FIG. 3.

One form of preform cutting element for a rotary drill bit, in accordance with the first aspect of the present invention, is shown in FIGS. 3 and 4. In this arrangement the cutting element is in the form of a circular tablet and comprises a front facing table 20 of superhard material bonded in a high pressure, high temperature press to a substrate 21 of less hard material. The facing table 20 may be of polycrystalline diamond and the substrate of tungsten carbide. However other suitable materials may also be used. For example, other suitable superhard materials for the facing table are cubic boron nitride and amorphous diamond-like carbon (ADLC). The methods of forming such elements are well-known and will not be described in detail.

FIG. 3 shows the rear surface of the facing table 20 with the substrate 21 removed to show the configuration of the rear surface of the facing table. As may be seen from FIG. 3, the rear surface is integrally formed with a plurality of spaced arcuate ribs 22. The opposite ends of each arcuate rib intersect the peripheral surface 23 of the facing table around a portion of the periphery thereof. The portion of the periphery of the facing table intersected by the ribs 22 defines the cutting edge of the preform element.

Figure 5:
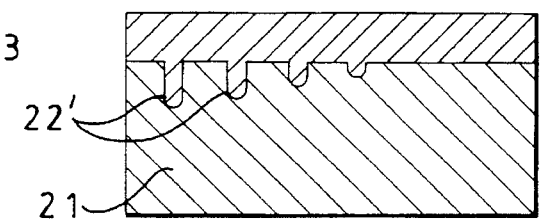
FIG. 5 is a cross-section of a modification of the cutting element of FIG. 4.
Figure 6:
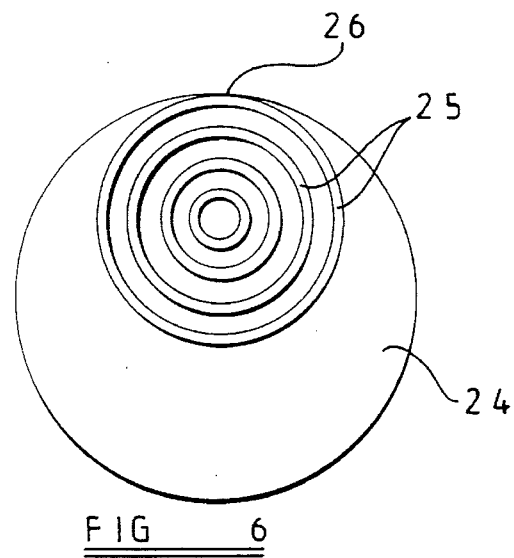
FIGS. 6–9 are similar views to FIG. 3 of alternative arrangements.

As shown in FIG. 4, the ribs 22 may be of constant width and project into the substrate 21 to a substantially constant depth. Alternatively, as shown in FIG. 5, the ribs, indicated at 22' in FIG. 5, may project into the substrate 21 to different depths, the depth decreasing with distance from the cutting edge. FIG. 6 is a similar view to FIG. 3 of the rear surface of the facing table 24 of a cutting element, showing an alternative embodiment of the invention. In this case the rear surface of the facing table 24 is integrally formed with a concentric array of four or more generally circular ribs 25.

The array of ribs is located adjacent the cutting edge 26 of the facing ruble and the outermost rib of the array is substantially tangential to the cutting edge 26. As in the previous arrangement, the ribs 25 may be of substantially constant depth or may vary in depth. For example, the ribs may increase in depth with increasing diameter, or may decrease in depth with increasing diameter.

Figure 7:
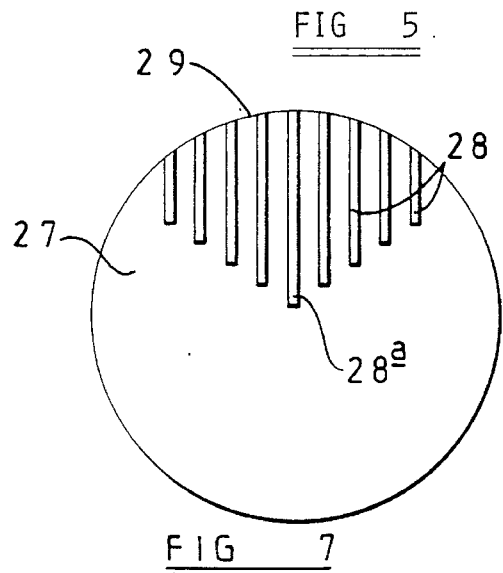

In the arrangement shown in FIG. 7, the facing table 27 of the cutting element is integrally formed with a plurality of substantially straight parallel ribs 28. One end of each rib 28 intersects the peripheral surface of the facing table 27 at a location on the cutting edge 29. The central rib 28a of the array is the longest rib and the other ribs progressively decrease in length with distance from the mid-point of the cutting edge 29.

Figure 8:
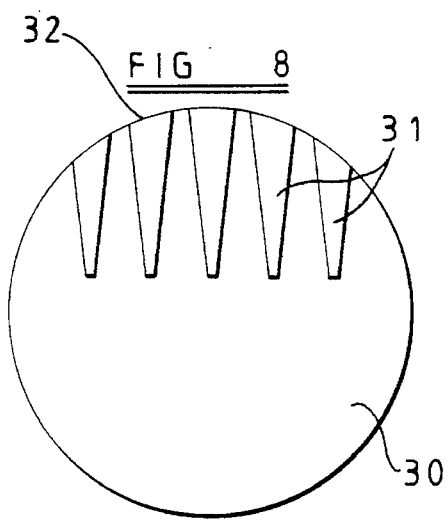

In the arrangement of FIG. 8, the rear surface of the facing table 30 of the cutting element is again formed with an array of generally parallel ribs 31, one end of each rib intersecting the cutting edge 32 of the facing table. In this case, however, each rib increases in width as it extends from the interior of the facing table 30 towards the cutting edge 32. The interior ends of the ribs 31 lie along a substantially straight line, so that, as in the previous arrangement, the actual overall length of the ribs decreases with distance from the mid-point of the cutting edge 32.

Figure 9:
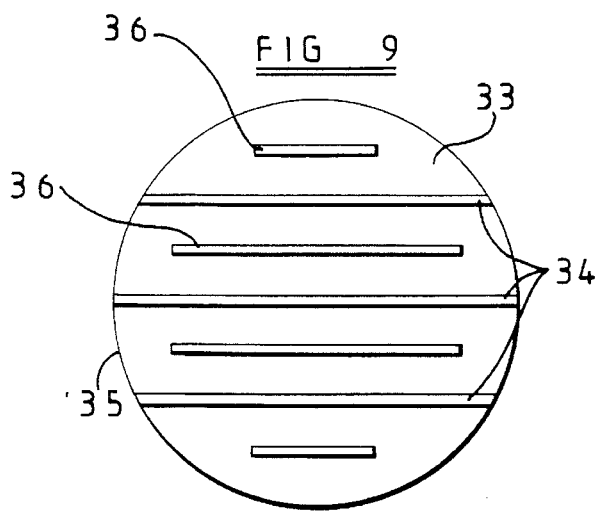

FIG. 9 shows a further arrangement, and in this case the rear surface of the facing table 33 is integrally formed with a first array of spaced parallel straight ribs 34. One end of each rib 34 intersects the cutting edge 35 of the facing table, and the ribs extend across the full width of the facing table so as also to intersect the periphery of the facing table opposite the cutting edge 35. The facing table is also formed with a second array of shorter straight parallel ribs 36 which are evenly spaced between the ribs 34 of the first array. Both ends of each rib 36 are spaced inwardly from the periphery of the facing table 33.

All of the above arrangements serve to increase the mechanical interlock between the facing table and the substrate in the vicinity of the cutting edge of the cutting element, and thus tend to inhibit spalling or delamination of the facing table from the substrate. The arrangement may also assist in strengthening the cutting element at the cutting edge against wear and impact damage. Also, as a wear flat develops at the cutting edge, the intersection of the ribs with the cutting edge provides projections of superhard material which may tend to enhance the cutting effect of the cutting element on the formation being cut.

In all of the described arrangements the ribs may be parallel-sided or may vary in width along their length. The fibs may also vary in depth along their length and different fibs may be of different depths. Generally speaking, however, the ribs are preferably generally deeper towards the periphery of the cutting element so as to provide improved locking between the front facing table and the substrate near the periphery of the element. The ribs may be parallel-sided in cross section, with a rounded lower edge, as shown in FIGS. 4 and 5, or they may be tapered inwardly or outwardly as they extend into the substrate from the rear surface of the facing table.

In any of the arrangements in accordance with the invention a transition layer may be provided between the facing table and the substrate. The transition layer may, for example, comprise polycrystalline diamond particles embedded in a tungsten carbide matrix.

Wherein the present invention has been described in particular relation to the drawings attached hereto, it should be understood that other and further modifications, apart from those shown or suggested herein, may be made within the scope and spirit of the present invention.

We claim:

1. A preform cutting element including a facing table of superhard material having a front face, a peripheral surface, and a rear surface bonded to a substrate which is less hard than the superhard material, a cutting edge forming part of the peripheral surface of the facing table, the rear surface of the facing table being integrally formed with a plurality of spaced elongate ribs of said superhard material which project into the substrate, at least the majority of said ribs being located in the vicinity of said cutting edge.

2. A preform cutting element according to claim 1, wherein said ribs are substantially parallel.

3. A preform cutting element according to claim 1, wherein at least one end of each rib intersects the peripheral surface of the facing table at a location on said cutting edge.

4. A preform cutting element according to claim 3, wherein said ribs are shaped so that both ends of each rib intersect the peripheral surface of the facing table at a location on said cutting edge.

5. A preform cutting element according to claim 4, wherein each rib is arcuate.

6. A preform cutting element according to claim 1, wherein said ribs are substantially straight and extend in directions transverse to said cutting edge.

7. A preform cutting element according to claim 6, wherein said ribs vary in length, being of maximum length in the region of the center of the cutting edge and being of progressively shorter length with distance away from the center of the cutting edge.

8. A preform cutting element according to claim 1, wherein said ribs comprise an array of concentric endless ribs located adjacent the cutting edge of the facing table.

9. A preform cutting element according to claim 8, wherein the outermost rib of the array is substantially tangential to the cutting edge.

10. A preform curing element according to claim 8, wherein said ribs are substantially circular.

11. A preform cutting element according to claim 8, wherein said ribs are of different depths.

12. A preform cutting element according to claim 1, wherein said ribs include a first array of spaced substantially straight ribs, one end of each rib intersecting the cutting edge and the other end of each rib intersecting the periphery of the facing table opposite the cutting edge, and a second array of shorter substantially straight ribs spaced between the ribs of the first array and having both ends thereof spaced inwardly from the periphery of the facing table.

13. A preform cutting element according to claim 1, wherein at least one of said ribs increases in depth as it extends towards the cutting edge.

14. A preform cutting element according to claim 1, wherein at least one of said ribs increases in width as it extends towards the cutting edge.

\* \* \* \* \*